(12) United States Patent
Ohmiya et al.

(10) Patent No.: US 7,558,495 B2
(45) Date of Patent: Jul. 7, 2009

(54) IMAGE FORMING APPARATUS

(75) Inventors: Takashi Ohmiya, Nagoya (JP); Nobuaki Fukasawa, Hitachi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 567 days.

(21) Appl. No.: 11/475,859

(22) Filed: Jun. 28, 2006

(65) Prior Publication Data
US 2007/0002383 A1 Jan. 4, 2007

(30) Foreign Application Priority Data
Jun. 30, 2005 (JP) .............................. 2005-191637

(51) Int. Cl.
*G03G 15/00* (2006.01)
(52) U.S. Cl. ........................... 399/45; 399/51; 399/381; 399/389
(58) Field of Classification Search .................. 399/45, 399/51, 381, 389
See application file for complete search history.

(56) References Cited

U.S. PATENT DOCUMENTS

| 6,916,131 B2 | 7/2005 | Nakasendo | |
| 2005/0041988 A1* | 2/2005 | Kaneko et al. | 399/45 |

FOREIGN PATENT DOCUMENTS

| JP | H63 202762 | 8/1988 |
| JP | H05 53397 | 3/1993 |
| JP | H06 143713 | 5/1994 |
| JP | H06 234440 | 8/1994 |
| JP | H07 61658 | 3/1995 |
| JP | H08 314232 | 11/1996 |
| JP | H10 20719 | 1/1998 |
| JP | H11 38843 | 2/1999 |
| JP | H11 125937 | 5/1999 |
| JP | 2000 137422 | 5/2000 |
| JP | 2001 13754 | 1/2001 |
| JP | 2001 154509 | 6/2001 |
| JP | 2001 272896 | 10/2001 |
| JP | 2001 281954 | 10/2001 |
| JP | 2002 296980 | 10/2002 |
| JP | 2003 150017 | 5/2003 |
| JP | 2003 246475 | 9/2003 |
| JP | 2003 323020 | 11/2003 |
| JP | 2004 326053 | 11/2004 |
| JP | 2005 43627 | 2/2005 |

\* cited by examiner

*Primary Examiner*—David M Gray
*Assistant Examiner*—Ryan D Walsh
(74) *Attorney, Agent, or Firm*—Baker Botts L.L.P.

(57) ABSTRACT

An image forming apparatus is provided that may prevent wasteful image forming in a state in which the loss or partial loss can occur of an image portion. If the length of the supplied sheet in the transport direction is shorter than a regular size by a predetermined value or more, then the laser exposing operation based on the received image data of the second or subsequent pages is stopped.

16 Claims, 5 Drawing Sheets

IMAGE FORMING APPARATUS

CROSS REFERENCE TO RELATED APPLICATION

This application claims priority from Japanese Patent Application No. 2005-191637 filed Jun. 30, 2005. The entire content of this priority application is incorporated herein by reference.

TECHNICAL FIELD

The disclosure relates to an image forming apparatus having an intermediate transfer device.

BACKGROUND

In an image forming apparatus of this type, a scanner device uses laser light to scan each set of data for a sheet from among a number of sheet data sets of image data. As a result, electrostatic latent images are sequentially formed on a photoconductor. A developer then develops these images. An intermediate transfer object sequentially supports the individual developer images, thereby forming a full representation of the image data from the developer image data on the intermediate transfer object. The combined supported developer images are then transferred to a transported sheet, thereby forming a printed image. After which, scanning of the next set of data for a subsequent sheet is immediately started without regard to the success or failure of the printing operation of the previous sheet.

The following patent documents 1 and 2 disclose the detection of a sheet at a predetermined position in order to transfer an image at a location for which the transferred image will not have missing portions (i.e., a loss of an image or a partial image) or without mutual interference from later or earlier images. In addition, the patent documents also disclose the determination of the timing for writing a developer image on the photoconductor.

[Patent Document 1] Japanese Laid-Open Patent No. 08-314232.

[Patent Document 2] Japanese Laid-Open Patent No. 2005-043627.

However, various sizes and types of sheet are loaded into an image forming apparatus. Among these types of sheet, the length of a loaded sheet (with respect to a transport direction) may be relatively short when compared with a nominal or regular size sheet. Additionally, an inappropriately sized sheet may be inadvertently loaded for image forming (e.g., such as the use of A4 size sheet in place of 8½×11 in). In this case, if the image forming is performed without correcting the situation, a part of the image may not appear on the sheet. As a result, only a partial image may be formed on the sheet. These results may not cause significant problems if the image data is received from a peripheral computer or if the image data is obtained by executing the copying function of the apparatus. This is because these operations can be easily repeated after arranging for an appropriately sized sheet.

However, when the image data is remotely transmitted through the communication circuit of a facsimile device, etc., for example, it may become necessary to request that the data source re-transmit the image data. In addition, in the case of a multi-page transmission, subsequent partial images may automatically continue to be output, unless the image forming operation is stopped. This wastes additional sheets.

Particularly, even if an image forming apparatus, provided with the previously identified intermediate transfer device, attempts to stop the image forming operation when an image loss is detected, for example by checking an output sheet, the developer images corresponding to a subsequent set of image data may already be formed on the intermediate transfer device. Therefore, resources are wasted, including developing agent, etc.

The present invention has been completed in consideration of the previously mentioned problems. An objective of this invention is to provide an image forming apparatus capable of preventing wasteful image formation when an image loss occurs.

SUMMARY

In order to attain this and other objectives, the image forming apparatus according to an aspect of the invention includes a photoconductor, and an exposure device exposing component image data via laser light. The exposure device forms an electrostatic latent image on the photoconductor. In addition, the image forming apparatus includes a development device forming a developer image on the photoconductor by developing the electrostatic latent image on the photoconductor, and an intermediate transfer device holding the developer image thereon, the developer image being transferred from the photoconductor and worth one page. The developer image is held by the intermediate transfer device and is transferred to a recording medium, resulting in the formation of an image. The recording medium is transported to a transfer position of the intermediate transfer device for image formation.

Along with this configuration, the image forming apparatus additionally includes a detection device for detecting the size of the recording medium. A determination device determining if the size of the recording medium produced by the detection device is enough for transferring the developer image (i.e., a print image) held by the intermediate transfer device. The image forming apparatus also includes a control device inhibiting the exposure device from forming an electrostatic latent image based upon image data for a subsequent page when the determination device determines the size of the recording medium produced by the detection device is not enough for transferring the developer image on the intermediate transfer device.

In the present invention, the "image forming apparatus" may not be only a printing device, such as a printer (for example, a laser printer, among others), but also may be a facsimile device or a composite machine having a combination of functions, such as a printer capability, copier capability, scanning capability, etc. The apparatus should not be limited to a multicolor development system of an intermediate transfer object system. In other words, a single color system can also be used.

A "recording medium" should not be limited to sheet based recording mediums such as printer sheet, etc., but can be any acceptable recording medium, such as a plastic recording medium, an OHP (Overhead Projection) sheet for example.

BRIEF DESCRIPTION OF THE DRAWINGS

Illustrative aspects in accordance with the invention will be described in detail with reference to the following figures wherein.

DETAILED DESCRIPTION

Image forming apparatus according to some aspects of the invention is explained hereafter via reference to FIGS. 1 to 5.

1. Internal Configuration of a Color Laser Printer

Figure 1:
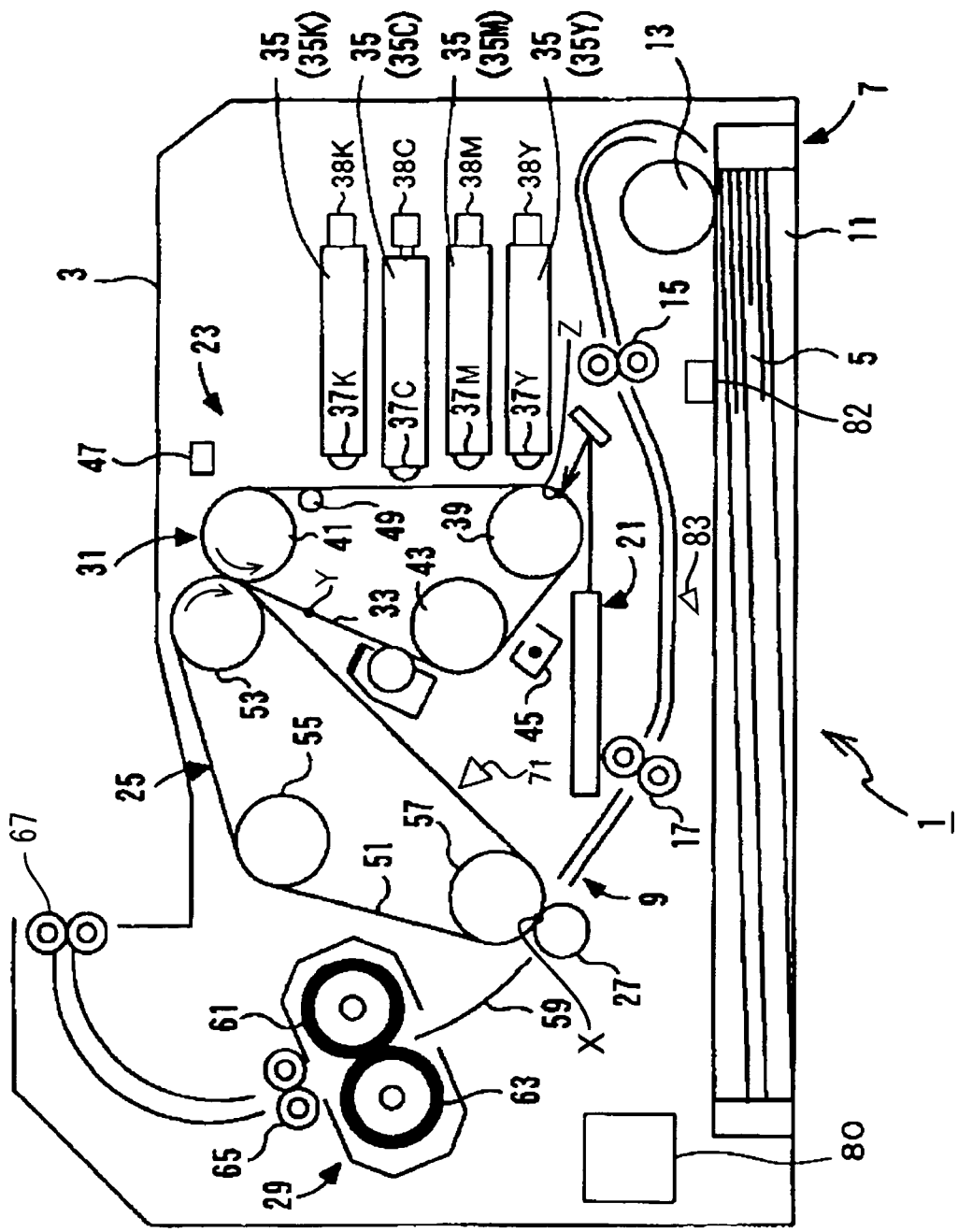
FIG. 1 is a sectional view of an outline of the central portion of the color laser printer according to one aspect of the invention.

FIG. 1 is a sectional view of an outline of the central portion of a color laser printer 1 (corresponding to an example of an "image forming apparatus") according to an aspect of the present invention. An original reading device 159 (see FIG. 3) is provided with an original table cover 160, among other components, and is described later. The original reading device 159 is omitted from FIG. 1.

In FIG. 1, the right portion of the drawing is described as the "front side" of the color laser printer 1. The color laser printer 1 shown in FIG. 1 is configured as a 4-cycle system color laser printer. A body casing 3 includes a sheet feed unit 7, for feeding sheets 5 (corresponding to examples of a "recording medium"), and an image-forming unit 9 for forming a predetermined image on the fed sheets 5.

(1) Sheet Feed Unit

The sheet feed unit 7 includes a sheet feed tray 11 containing a stack of sheets 5 (for example), a sheet feed roller 13 contacting the sheet 5 at the top of the sheet feed tray 11 and feeding each sheet 5 via the rotation of the sheet feed roller 13, a transport roller 15 for transporting the sheet 5 to a transfer position X, and a resist roller 17.

The transfer position X is the position at which a visible image (e.g., a combination of individual developer images) supported on an intermediate transfer belt 51 is transferred to the sheet 5. The transfer position X also corresponds to a position of contact between the intermediate transfer belt 51 and a transfer roller 27, described later.

(2) Image Forming Unit

The image forming unit 9 is provided with a scanner unit 21, a process unit 23, an intermediate transfer belt mechanism unit 25, a transfer roller 27, and a fixing unit 29, among others.

a. Scanner Unit

The scanner unit 21 (corresponding to an example of an "exposure device") is provided with a laser emission unit, polygon mirror, a plurality of sensors, and a reflector (not shown in the attached drawings), at a central front portion of the body casing 3. The laser beam may be emitted by the laser emission unit. The scanner unit 21 passes or reflects the laser beam, via the polygon mirror, reflector, and lenses, according to the component image data. The scanner unit 21 then illuminates the surface of a photoconductor belt 33 of a belt photoconductor mechanism unit 31, described later along with high-speed scanning.

b. Process Unit

The process unit 23 is provided with a plurality (e.g., four in this aspect) of development cartridges 35 (corresponding to examples of a "development device"), and the belt photoconductor mechanism unit 31, among others. Each of the four development cartridges 35 is provided for an individual color. In other words, a yellow development cartridge 35Y contains yellow toner, a magenta development cartridge 35M contains magenta toner, a cyan development cartridge 35C contains cyan toner, and a black development cartridge 35K contains black toner. The cartridges are sequentially arranged near the front of the body casing 3 in a vertical line at predetermined intervals.

Each of the development cartridges 35 is respectively provided with a separate development roller 37 (e.g., a yellow development roller 37Y, a magenta development roller 37M, a cyan development roller 37C, and a black development roller 37K), a thickness restriction blade, a supply roller, and a toner container unit, among others, not all are shown in the attached drawings. Each of the development cartridges 35 is also respectively provided with a separate parting solenoid 38 (e.g., a yellow parting solenoid 38Y, a magenta parting solenoid 38M, a cyan parting solenoid 38C, and a black parting solenoid 38K) to allow each of the development cartridges 35 to contact or to be separated from the surface of the photoconductor belt 33, which is described later. The parting solenoids 38 provide movement along a horizontal direction (e.g., as viewed in FIG. 1).

A roller made from an elastic material, which may be a conductive rubber material, covers each of the development rollers 37. Customarily, the roller of a development roller 37 is formed as a double structure configured with an elastic roller portion made of conductive urethane rubber, including carbon particles, silicon rubber, EPDM rubber, etc., for example, and a coating layer primarily made of urethane rubber, urethane resin, polyimide resin, etc., for example, coating the surface of the roller portion. For the development roller 37, a predetermined development bias is applied to the belt photoconductor 33 at development (i.e., when applying toner to the belt photoconductor 33). In addition, a predetermined collection bias is applied when the toner is collected. For example, the predetermined development bias may be +300V, and the predetermined collection bias may be −200V.

The toner container unit for each of the development cartridges 35 contains a normally electrified, non-magnetic, single-ingredient, spherical polymeric toner for a single color, e.g., yellow, magenta, cyan, and black. For development, the toner is supplied to the development roller 37 through the rotation of the supply roller and the positively friction-electrified area between the supply roller and the development roller 37.

The toner supplied to the development roller 37 enters between the thickness restriction blade and the development roller 37 via the rotation of the development roller 37. The toner is fully friction-electrified and a thin layer of toner having a constant thickness is supported on the development roller 37.

For collection, the toner is collected from the photoconductor belt 33 by applying an inverse bias to the development roller 37. The toner is then stored in the toner container unit.

The belt photoconductor mechanism unit 31 is provided with a first roller 39, a second roller 41, and a third roller 43. In addition, a photoconductor belt 33 is wound about the rollers 39, 41, and 43. Also included in the belt photoconductor mechanism unit 31 are a photoconductor belt electrifier 45, a potential adder 47, and a potential gradient controller 49. The configuration of the belt photoconductor mechanism unit 31 is described in detail later.

c. Intermediate Transfer Belt Mechanism Unit

The intermediate transfer belt mechanism unit 25 is arranged behind the belt photoconductor mechanism unit 31. The intermediate transfer belt mechanism unit 25 has a first intermediate transfer roller 53, arranged substantially opposite to the second organic photoconductor roller 41 via the photoconductor belt 33 and an intermediate transfer belt 51 described later. In addition, a second intermediate transfer roller 55 is arranged diagonally behind and below the first intermediate transfer roller 53. A third intermediate transfer roller 57 is arranged opposite of the transfer roller 27 (described later), provided behind the second intermediate transfer roller 55 via the intermediate transfer belt 51. The intermediate transfer belt 51 (corresponding to an example of an "intermediate transfer device") is wound outside of the first intermediate transfer roller 53 to the third intermediate transfer roller 57.

The intermediate transfer belt 51 may be formed by an endless belt made of a resin such as a conductive polycarbonate having dispersed conductive particles of carbon, polyimide, etc., for example. The first intermediate transfer roller 53 to the third intermediate transfer roller 57 are triangularly arranged and joined together via the intermediate transfer belt 51. The first intermediate transfer roller 53 is rotated through a drive gear (not shown in the attached drawings) by driving a main motor 96 (described later, and shown in FIG. 2). The second intermediate transfer roller 55 and the third intermediate transfer roller 57 are driven following the first intermediate transfer roller 53. As a result, the intermediate transfer belt 51 is driven around the intermediate transfer rollers 53 to 57 (e.g., in a clockwise direction).

A density detection sensor 71 is also provided for detecting the density of each color on the intermediate transfer belt 51. The density detection sensor 71 is configured by a light source emitting light of an infrared spectrum, a lens projecting the light of the light source to the intermediate transfer belt 51, and a photo transistor for receiving the reflected light.

d. Transfer Roller

The transfer roller 27 is arranged opposite to the third intermediate transfer roller 57 of the intermediate transfer belt mechanism unit 25 via the intermediate transfer belt 51. A roller made of a conductive rubber material covers a metal roller axis and the axis is rotatably supported. The transfer roller 27 is configured to move to a standby position, separated apart from the intermediate transfer belt 51, and a transferable position, close to the intermediate transfer belt 51, due to the transfer roller contacting/separating mechanisms (not shown in the attached drawings).

The transfer roller contacting/separating mechanisms are arranged opposing each other with the transport path 59 of the sheet 5 between them, in the width direction of the sheet 5 (i.e., in the depth direction of the sheet as shown in FIG. 1). At the transferable position, the transfer roller 27 is configured to press the sheet 5, which passes through the transport path 59, together with the intermediate transfer belt 51.

The transfer roller 27 is located in the standby position (described below) during printing, while a visible image for each color (i.e., a developer image) is being sequentially transferred to the intermediate transfer belt 51. The transfer roller 27 is located in the transferable position when all of the visible images have been transferred from the photoconductor belt 33 to the intermediate transfer belt 51. At this point, a full color image (i.e., a print image) has been formed on the intermediate transfer belt 51.

During calibration, the transfer roller 27 is controlled so as to remain located in the standby position. Furthermore, a predetermined transfer bias of the intermediate transfer belt 51 is applied to the transfer roller 27 in the transferable position by the transfer bias application circuit (not shown in the attached drawings).

e. Fixing Unit

The fixing unit 29 is arranged behind the intermediate transfer belt mechanism unit 25. The fixing unit 29 is provided with a heating roller 61, a pressure roller 63 for pressing the heating roller 61, and a pair of transport rollers 65 mounted downstream from the heating roller 61 and the pressure roller 63. The heating roller 61 is provided with an outside layer of silicon rubber, a metal inside layer, and a halogen lamp for heating.

2. Detailed Explanation of the Belt Photoconductor Mechanism Unit

Described in detail below is the belt photoconductor mechanism unit 31 of the image-forming unit 9.

The first roller 39 is arranged behind and lower than the yellow development cartridge 35Y, which is located at the lowest position of the four development cartridges 35 (as seen in FIG. 1). The first roller 39 is driven in an interlocking manner by the rest of the belt photoconductor mechanism unit 31.

The second roller 41 is arranged vertically higher than the first roller 39 and higher than the black development cartridge 35K, which is positioned at an uppermost position of the development cartridges 35 (as seen in FIG. 1). The second roller 41 is driven and rotated via a driving gear (not shown in the attached drawings).

The third roller 43 is arranged diagonally behind and above the first roller 39. The third roller 43 is rotated in an interlocking manner similar to the first roller 39. Therefore, the first roller 39, the second roller 41, and the third roller 43, are triangularly arranged and associated with one another.

The second roller 41 is given a potential of +800V by the potential adder 47, which is arranged near the roller, using the power source of the photoconductor belt electrifier 45. The first roller 39 and the third roller 43 are configured from a conductive material, aluminum for example. These rollers contact a base layer of the photoconductor belt 33 described later, and are connected to a GND (ground) terminal not shown in the attached drawings. In other words, the first roller 39 and the third roller 43 maintain the potential of the photoconductor belt 33 by being positioned in contact with each other via the ground.

The photoconductor belt 33 is wound around the first roller 39, the second roller 41, and the third roller 43. When the second roller 41 is rotated and driven, the first roller 39 and the third roller 43 are driven in an interlocking manner. Consequently, the photoconductor belt 33 is rotated (e.g., counter-clockwise).

The photoconductor belt 33 is an endless belt provided with a 0.08 mm thick base layer (i.e., conductive base layer) and a 25 μm photoconductive layer on one side of the base layer. A nickel conductor, formed through a nickel galvano-plastics method, for example, constitutes the base layer. A photoconductor of a polycarbonate type resin constitutes the photoconductive layer.

The photoconductor belt electrifier 45 is arranged below the belt photoconductor mechanism unit 31, upstream from the exposure portion of the scanner unit 21 to the photoconductor belt 33. The photoconductor belt electrifier 45 is near the first roller 39 and faces the photoconductor belt 33 without contact at a predetermined spacing. The photoconductor belt electrifier 45 is a scorotron type electrifier used for positive electrification through the generation of a discharge of a corona from an electrifying wire such as tungsten, etc. The photoconductor belt electrifier 45 is designed such that the surface of the photoconductor belt 33 can be uniformly electrified as a cathode.

The potential gradient controller 49 is located between the second roller 41 and the first roller 39. The potential gradient controller 49 contacts the base layer of the photoconductor belt 33 at a position higher than the black development cartridge 35K. The potential gradient controller 49 sets the potential of the base layer at ground level at the contact point of the potential gradient controller 49.

3. Basic Operation During Printing of the Color Laser Printer 1

The operation of the color laser printer 1 during printing is described below. A control device 90, which is described later, realizes these operations and controls each unit.

The top sheet of the stack of sheets 5, stored on the sheet feed tray 11 of the sheet feed unit 7, is pressed by the sheet feed roller 13. The sheets 5 are individually supplied sheet by sheet via the rotation of the sheet feed roller 13. The supplied sheets 5 are brought to the transfer position X by the transport roller 15 and the resist roller 17. The resist roller 17 applies a predetermined resistance to the fed sheet 5.

The surface of the photoconductor belt 33 is uniformly and positively electrified by the photoconductor belt electrifier 45. Based upon the image data, the surface is then exposed through high speed scanning by a laser beam from the scanner unit 21. Since the electrification is released on the exposed portion, an electrostatic latent image in which a positively electrified portion and a non-electrified portion are arranged is formed on the surface of the photoconductor belt 33 according to the image data. At this time, the first roller 39 and the third roller 43 supply electric power to the base layer of the photoconductor belt 33 contacted by the rollers. The rollers maintain the potential of the contacting portion as GND.

The yellow development cartridge 35Y of the development cartridges 35 is moved by the yellow parting solenoid 38Y horizontally backward to the photoconductor belt 33. The development roller 37Y of the yellow development cartridge 35Y is made to contact the photoconductor belt 33, on which the electrostatic latent image has been formed.

The yellow toner contained in the yellow development cartridge 35Y is positively electrified and therefore only attaches to the non-electrified portions of the photoconductor belt 33. As a result, a visible yellow image (i.e., a developer image) is formed on the photoconductor belt 33. At this time, the magenta development cartridge 35M, the cyan development cartridge 35C, and the black development cartridge 35K, are each moved horizontally forward by a corresponding parting solenoid 38M, 38C, and 38K. These remaining cartridges (35M, 35C, and 35K) are separated from the photoconductor belt 33.

The visible yellow image formed on the photoconductor belt 33 is transferred to the surface of the intermediate transfer belt 51 when the developer image opposes the intermediate transfer belt 51 through the movement of the photoconductor belt 33.

At this time, a sequential bias (e.g., a potential of +300V) is added to the second roller 41 from the power source of the photoconductor belt electrifier 45. Through the conductive base layer, the photoconductive layer near the second roller 41 then registers a potential of +300V. Therefore, a repulsion arises between the positively electrified yellow toner and the positively electrified photoconductive layer, easily accomplishing the transfer of the yellow toner to the intermediate transfer belt 51.

Similarly for magenta, an electrostatic latent image is formed on the photoconductor belt 33 as previously described. A visible magenta image is then formed. The visible magenta image (i.e., a developer image) is transferred to the intermediate transfer belt 51.

In other words, an electrostatic latent image is formed on the photoconductor belt 33. The magenta development cartridge 35M is then moved horizontally backward by the magenta parting solenoid 38M, thereby causing the development roller 37M of the magenta development cartridge 35M to contact the photoconductor belt 33. At this time, the yellow development cartridge 35Y, the cyan development cartridge 35C, and the black development cartridge 35K, are each moved horizontally forward by the corresponding parting solenoids 38Y, 38C, and 38K. As a result, the remaining development cartridges (35Y, 35C, and 35K) are separated from the photoconductor belt 33.

Therefore, a visible magenta image is formed on the photoconductor belt 33 only by the magenta toner contained in the magenta development cartridge 35M. The visible magenta image is transferred by the movement of the photoconductor belt 33 relative to the intermediate transfer belt 51, as previously described. The visible magenta image is superposed on the visible yellow image transferred earlier when the visible magenta image opposes the intermediate transfer belt 51.

A similar operation is repeated using the cyan toner contained in the cyan development cartridge 35C and the black toner contained in the black development cartridge 35K. Consequently, a full color image (i.e., a print image) is formed on the intermediate transfer belt 51.

The color images formed on the intermediate transfer belt 51 are collectively transferred to a sheet 5 by the transfer roller 27. The transfer roller 27 is located in the transferable position when the sheet 5 passes the transfer position X, located between the intermediate transfer belt 51 and the transfer roller 27.

The heating roller 61 of the image fixing unit 29 thermally fixes the color images transferred to the sheet 5 while the sheet 5 is passing between the heating roller 61 and the pressure roller 63.

Transport rollers 65 then transport the sheet 5, thermally fixed by the fixing unit 29, to a pair of sheet ejection rollers 67. The sheet 5, transported to the sheet ejection rollers 67, is ejected to a sheet ejection tray 69 (see FIG. 3) formed above the body casing 3.

Consequently, color printing may be performed on a sheet.

4. Electrical Configuration

Figure 2:
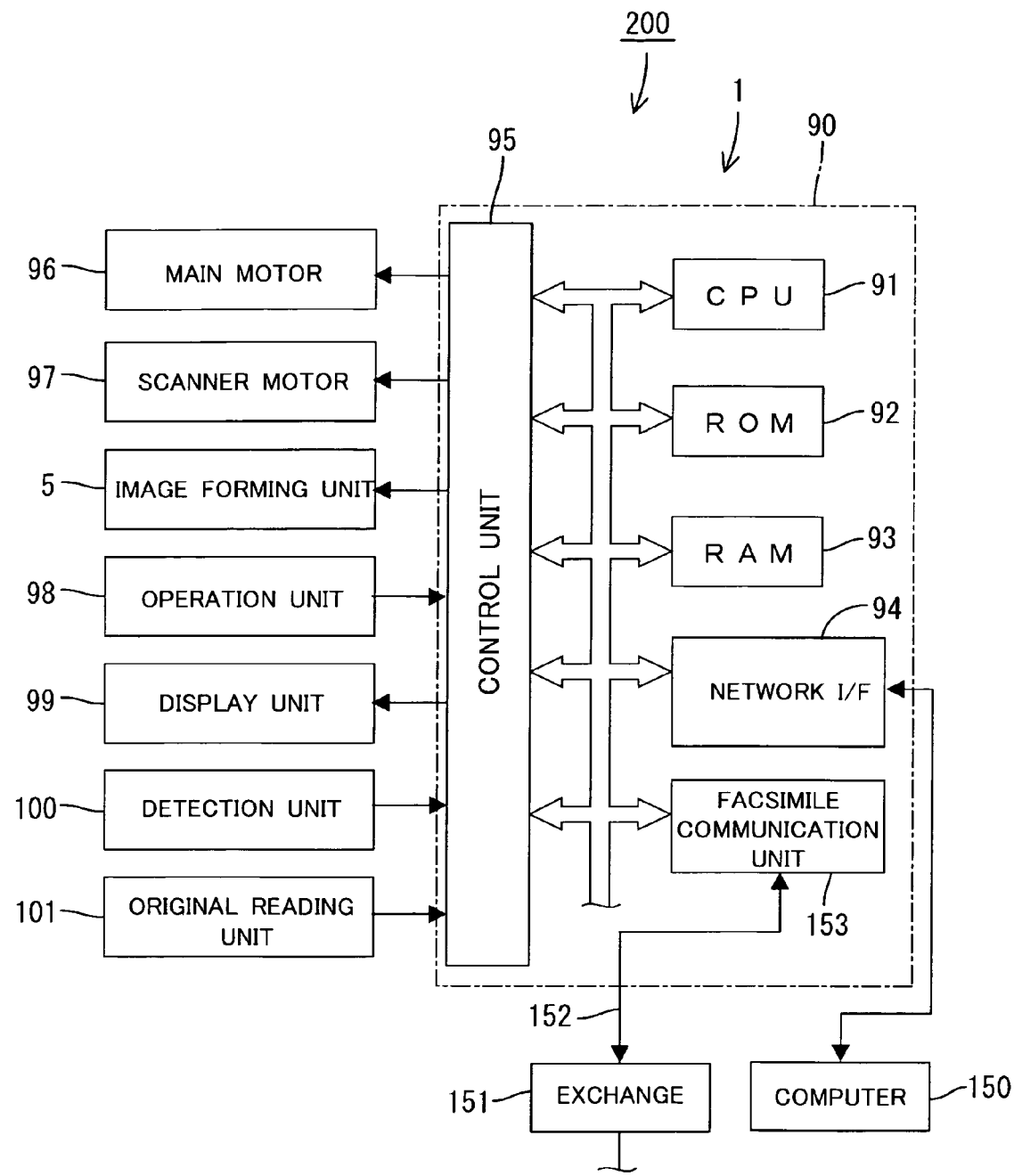
FIG. 2 is a block diagram showing an overview of the electrical configuration of the laser printer.

The electrical configuration of the color laser printer 1 is described next. FIG. 2 is a block diagram showing the general organization of an electric configuration of the color laser printer 1.

The color laser printer 1 includes a control device 90 for controlling each component via a control unit 95. The control device 90 also includes a CPU 91, ROM 92, RAM 93, and an ASIC (Application Specific Integrated Circuit). Additionally, a main motor 96, a scanner motor 97, an operation unit 98 including an input panel, etc., a display unit 99 including various lamps, etc., a detection unit 100 including various sensors, etc. are provided and are electrically connected to the control unit 95. Therefore, a complete control system can be constituted.

The ROM 92 and the RAM 93 are connected to the CPU 91. The CPU 91 allows the RAM 93 to store a process result in a procedure stored in the ROM 92, thereby controlling each component via the control unit 95.

The main motor 96 synchronizes and rotates the second roller 41 and the first intermediate transfer roller 53, etc. The scanner motor 97 rotates the polygon mirror, etc. in the scanner unit 21.

The CPU 91 functions as a drive-control for the main motor 96 and the scanner motor 97, based upon a program previously stored in the ROM 92.

The control unit 95 controls the actions of the sheet 5 according to commands from the CPU 91. Customarily, the control unit 95 controls the exposure on the surface of the photoconductor belt 33 via the scanner unit 21, and controls a transfer bias when the toner is transferred from the intermediate transfer belt 51 to the sheet 5, etc.

The control device 90 is provided with a network interface 94 (network I/F) in order to connect the control device 90 to external equipment such as a personal computer, etc. The network I/F 94 may be connected to a computer 150 (corresponding to an example of a "terminal device"). An image forming system 200 may be constituted by the color laser printer 1 and a computer 150.

The control device 90 may be provided with a facsimile communication unit 153 connected to a telephone line 152. The telephone line 152 may then be coupled to an exchange 151. The facsimile communication unit 153 includes an NCU, which is connected to the telephone line 152 for line-controlling, a modem for modulating, demodulating, and transmitting image information and transmitting/receiving various procedure signals for transmission control, and a buffer for temporarily storing the data (hereinafter referred to as "facsimile data") including coded image information for communication with a partner communication device (for example, a facsimile device), etc.

The NCU receives a call signal transmitted from the exchange 151, and a telephone number of a partner communication device, etc., and transmits a dial signal used for transmission, depending upon the operation of buttons on the operation panel 164. Furthermore, the NCU transmits and receives an analog audio signal during communications.

A detection unit 100 is constituted by the density detection sensor 71, a sheet density sensor 82 for detecting the density of a sheet, for example, and a sheet length sensor 83 (corresponding to an example of a "detection device") for detecting the length of a sheet in the transport direction (i.e., the length in the secondary scanning direction) between the transport roller 15 and the resist roller 17. These sensors are electrically connected to the control unit 95.

Figure 3:
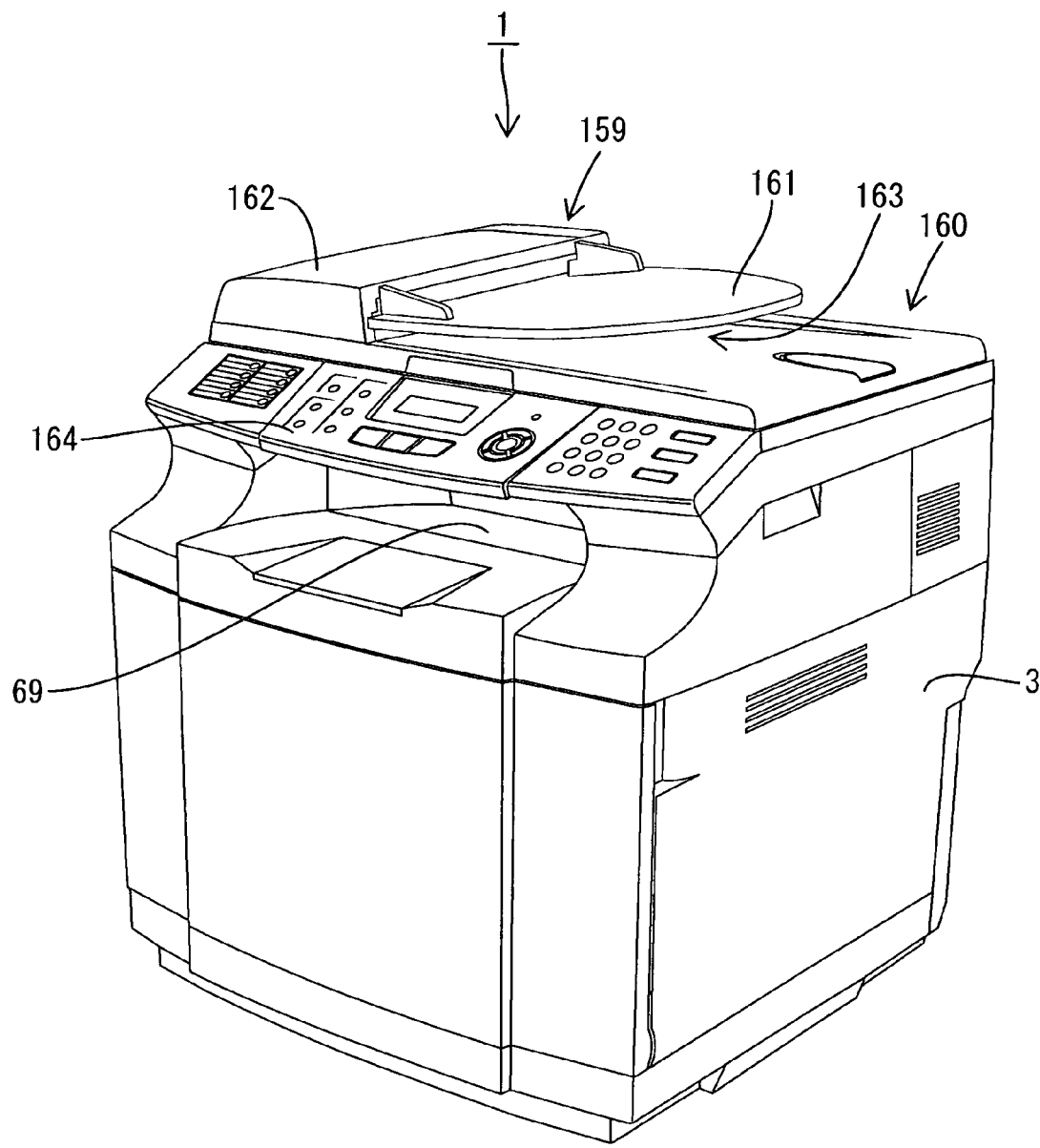
FIG. 3 is a complete perspective view of the color laser printer.

FIG. 3 shows the overall appearance of an entire color laser printer 1. The "front side" of the color laser printer 1 refers to the diagonally left lower portion of the drawing. A color laser printer 1 according to the present aspect is provided with an original reading device 159 located above the body casing 3. The original reading device 159 is provided with an original table cover 160, which is freely opened and closed about one end portion (e.g., the diagonally right upper end portion, as shown in FIG. 3). The original table cover 160 covers the original table (not shown in the attached drawings), on which an original is placed, from above. The original table cover 160 is provided with an original storage tray 161 and an automatic original feed device 162.

An original to be transmitted to a partner communication device via the facsimile function or an original to be copied via the copy function are carried from the original storage tray 161 to an automatic original feed device 162. These originals are then read as image data by an original reading unit 101 (corresponding to an example of an "original reading device") shown in FIG. 2. The originals are then ejected from an original ejection slit 163 formed between the original storage tray 161 and the original table cover 160.

An operation panel 164 is provided at the front side of the original table cover 160. The operation panel 164 includes the operation unit 98 and the display unit 99.

The CPU 91 performs the process of forming an image on the sheet 5 (i.e., recording surface) through drive-control of each unit as described above. The image may be based on image data (hereinafter also referred to as "printer data"), input from the computer 150 through the network I/F 94, facsimile data, received from a partner communication device through the facsimile communication unit 153, or scanning data from the original reading unit 101.

5. Control of the Image Forming Unit by the CPU

Figure 4:
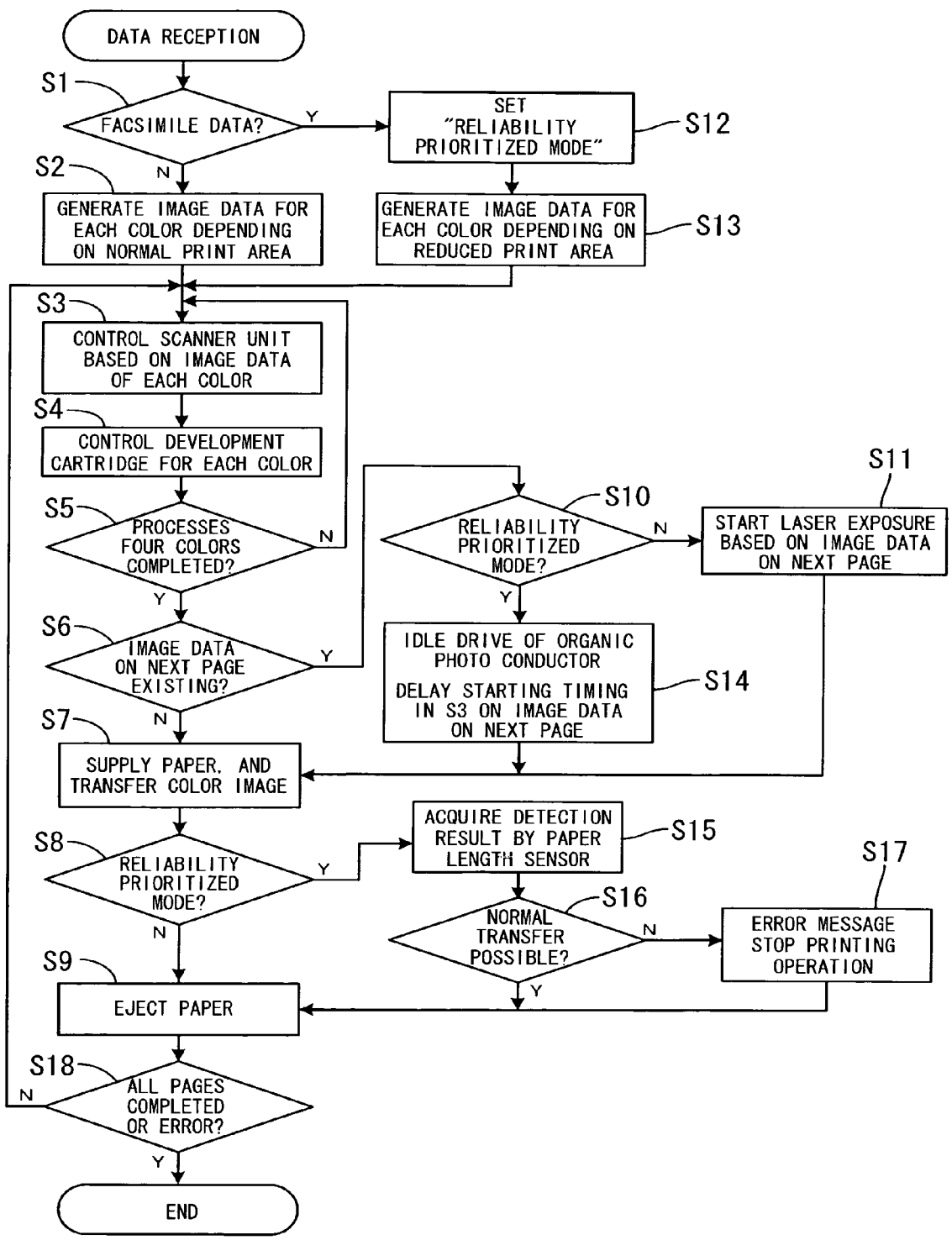
FIG. 4 is a flowchart of the contents of the control performed by the CPU for the image forming unit.
Figure 5:
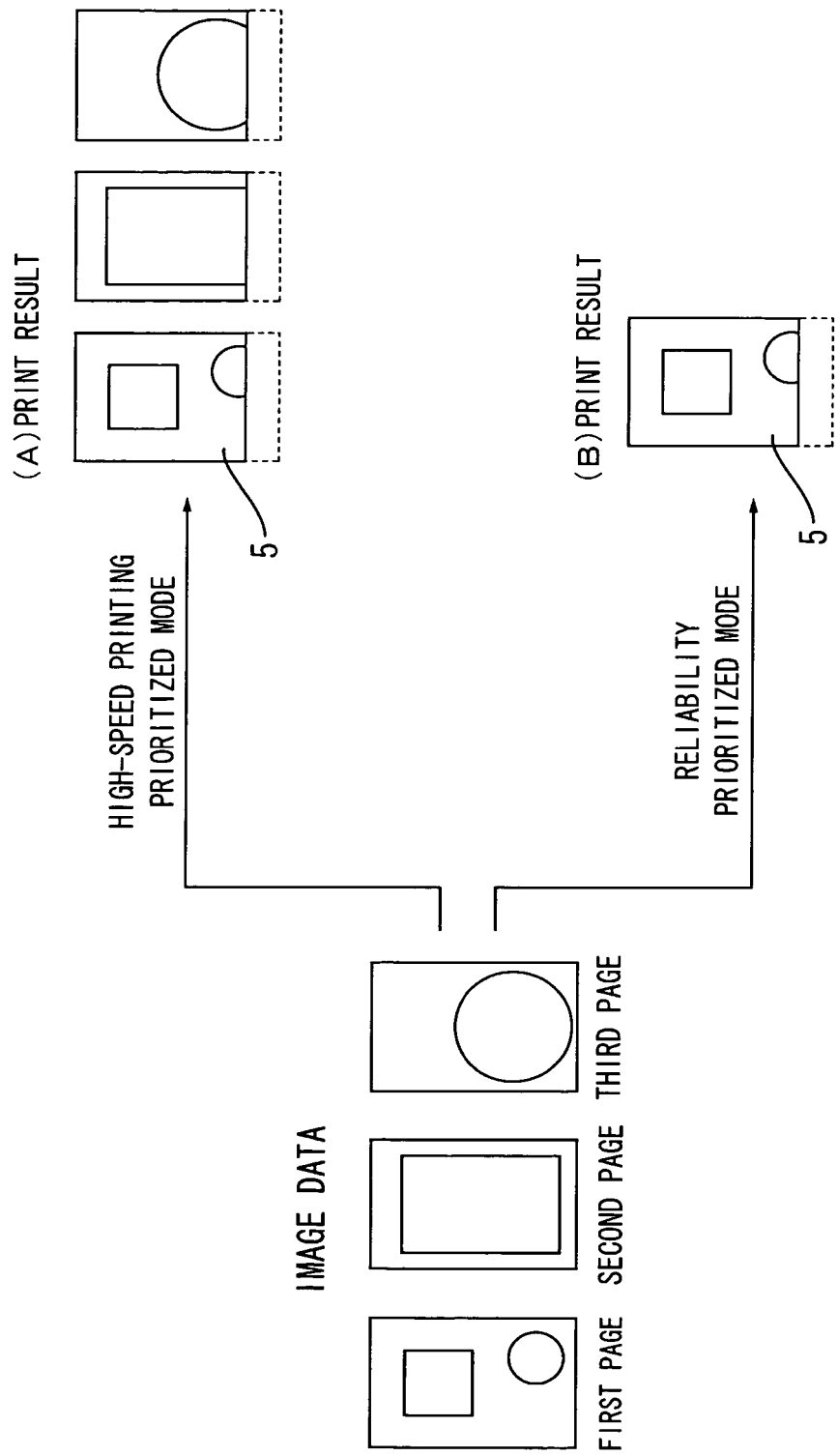
FIG. 5 is a simplified schematic chart showing original image data and two examples of the printed results.

FIG. 4 is a flowchart showing steps involved in the control of the sheet 5 as executed by the CPU 91 when printer data, facsimile data, or scanning data is received. In this explanation, the printer data, facsimile data, and scanning data are assumed to be the image data for three pages in a regular size (e.g., an A4 size for this aspect), as shown in FIG. 5. The width (i.e., the length in a direction perpendicular to the transport direction) of the sheet 5 loaded into the sheet feed tray 11 may be equal to the width of an A4 size, but the length (i.e., along the transport direction) is shorter than the length of an A4 size.

(1) Start-Before-Determination Process (High-speed Printing Prioritization Mode)

In the present aspect, the CPU 91 performs a "start-before-determination process" as described below when the received image data is printer data, received through data communication with the computer 150, or scanning data, generated by the original reading unit 101. The data may be customarily or ordinarily received.

When one page of image data has been received, the CPU 91 determines in S1 (shown in FIG. 4) whether or not the received image data is facsimile data. If the received image data is printer data or scanning data ("N" in S1), image data for each respective color (i.e., developer image) is generated in S2 depending on a normal print area (i.e., corresponding to an "image forming area for the recording medium") based on the image data received.

The normal print area refers to an area in which image forming can be performed on the sheet 5 with a predetermined level of quality. In the present aspect, the normal print area is an area 3 mm, for example, inside of the circumference of an A4 sized sheet. The image data for each color is created for the generation of an electrostatic latent image on the outer surface of the photoconductor belt 33 of a size able to be contained within the normal print area. The processes in S1 and S2 are sequentially performed each time a new page of image data is received.

Next in S3, the exposing operation is started when the laser exposure starting position Z of the rotating photoconductor belt 33 of the belt photoconductor mechanism unit 31 reaches an appropriate location. The laser exposure starting position Z refers to a position after which the laser exposure can begin by the scanner unit 21. The electrostatic latent image corresponding to the yellow image data of the first page is formed upon the outer surface of the photoconductor belt 33. In the present aspect, the laser exposure starting position Z is predetermined at a position so as to exclude a joint Y of the photoconductor belt 33 (refer to FIG. 1) from a developer image formation.

In S4, the CPU 91 operates the yellow development cartridge 35Y via the control unit 95. The electrostatic latent image is developed as a visible yellow image (i.e., developer image). The visible yellow image is then transferred to the surface of the intermediate transfer belt 51. The laser exposing operation of the scanner unit 21 and the developing operation of the development cartridges 35 are also sequentially performed for magenta, cyan, and black. Each operation correlates to a single rotation of the organic photoconductor 33. As a result, a full color image (i.e., print image) is formed on the intermediate transfer belt 51 ("Y" in S5).

In S6, it is then determined whether or not there is image data for another page. If not ("N" in S6), the sheet feeding operation is performed for a sheet 5 loaded in the sheet feed tray 11. The full color image formed on the intermediate transfer belt 51 is transferred to the fed sheet 5 in S7. At this time since the "high-speed printing prioritized mode" is set ("N" in S8), the sheet 5 with the transferred color image is ejected (S9) to the sheet ejection tray 69, thereby completing a printing operation.

On the other hand, if there is image data for another subsequent page ("Y" in S6), then the laser exposing operation is allowed in S11 based upon the image data of the next page since the "high-speed printing prioritizing mode" is set ("N" in S10). Control is returned to S3 and the processes in S3 to S5 are started, unless the processing of all of the pages of the image data are completed ("N" in S18). In other words, in the "high-speed printing prioritized mode" the laser exposing operation of the scanner unit 21 and the developing operation of the development cartridges 35 are started, based upon the image data of the second page and beyond, without waiting for determination results as to whether or not a normal transfer had been previously performed.

Therefore, although a sheet 5 may be loaded having a shorter than normal length in the transport direction, the printing speed is prioritized. As a result, a partial image is printed on each of the shorter pages. The last end portion of the image is lost for each of the three sheets 5 (as shown in FIG. 5A) that have a shorter length in the transport direction than an A4 sized sheet.

(2) Start-After-Determination Process (Reliability Prioritized Mode)

When the received image data is facsimile data received via the execution of the facsimile capability, the "start-after-determination process" is performed as described below. In particular, when a page of image data is initially received and after each subsequent page of image data is received the CPU 91 determines whether or not the received image data is facsimile data in S1, as shown in FIG. 4. If the data is facsimile data ("Y" in S1), the "reliability prioritized mode" is automatically set in S12.

Based on the received image data, a developer image for each color is generated in S13 that corresponds to a reduced print area (corresponding to an "image forming area for the recording medium"). The reduced print area is reduced from the above-mentioned normal print area by an additional 10 mm (for example), shortening the trailing print edge in the transport direction (e.g., 13 mm inside of the trailing perimeter of an A4 size). Developer data is generated for each color so as to form a reduced electrostatic latent image corresponding to the reduced print area. The reduced electrostatic latent image is formed on the outer surface of the photoconductor belt 33.

The sheet length sensor 83 is provided with a lever (not shown in the attached drawings) movably attached in the transport path of the sheet 5. The sheet length sensor 83 measures the length of a sheet 5 in the transport direction based upon an amount of time and the transport speed of the sheet 5. The amount of time is determined from the point when the lever of the sheet length sensor 83 touches the first (leading) edge of the transported sheet 5 and is held away from the transport path, to the recovery time after the last (trailing) edge of the sheet 5 passes.

However, there may be a detection error (e.g., a maximum of 10 mm in the present aspect) due to an operational delay of the lever, the sheet 5 slipping in the transport process, or a distortion of the end of the sheet 5. As a result, the reduced print area is determined by taking into account these potential errors. The reduced print area (i.e., the length of the recording medium in the transport direction) can be modified, for example, through an operation of the operation panel 164.

Afterwards, as with the start-before-determination process, the laser exposing operation of the scanner unit 21 and the developing operation of the development cartridges 35 are sequentially performed for yellow, magenta, cyan, and black, each time the photoconductor belt 33 completes a revolution. Consequently, this forms a full color image (i.e., a print image) on the intermediate transfer belt 51 (S3 to S5)

When there is image data for another page ("Y" in S6), the timing for the starting of the laser exposing operation based upon the next page of image data is delayed in S14 because the reliability prioritized mode is set ("Y" in S10). For example, the photoconductor belt 33 may be idly driven through one cycle of rotation. The sheet feeding operation is then performed for the sheet 5 loaded in the sheet feed tray 11. The color image is transferred in S7 to the first page. At this time, since the reliability prioritized mode is set ("Y" in S8), the detection results are acquired from the sheet length sensor 83 in S15.

Based upon the detection results, in S16 it is determined whether or not a color image has been normally transferred to the sheet 5 currently being transported, without suffering any image loss. At this time, the CPU 91 may function as a "determination device". In particular, when the transport direction length of the sheet 5 being currently transported is shorter than an A4 size by 3 mm or more, for example, it is determined that an abnormal transfer has occurred along with a loss of a portion of the color image ("N" in S16). The determination value (e.g., 3 mm) can be modified, for example, through an operation of the operation panel 164.

When the difference is less than 3 mm in the transport direction length between the sheet 5 being currently transported and an A4 sized sheet, a normal transfer is determined to be possible ("Y" in S16). As a result, the laser exposing operation for the received image data of the second (i.e., subsequent) page is allowed. After returning to S3, when the laser exposure starting position Z of the photoconductor belt 33 in an idle operation reaches the point where the exposing operation of the scanner unit 21 can be performed (e.g., after a revolution of the idle operation of the photoconductor belt 33 in the present aspect), the laser exposure is started again based upon the received image data for the second page. The performed process is similar to the previously described process.

In other words, in the reliability prioritized mode the laser exposing operation (based on the image data of a subsequent page) is not performed until it is determined whether or not a normal transfer has been accomplished, based upon the detection of the length in the transport direction of the sheet 5. Subsequently, unless the processing of the received image data of all pages are completed ("N" in S18) control is returned to S3, and the processes in S3 to S5 are repeated. As a result, three sheets 5 may be ejected without suffering from a partial image loss. At this time, the CPU 91 is functioning as a "control device".

In the reliability prioritized mode, since the image formed on the page 5 is reduced in order to correspond to the reduced print area, the loss of an image can be avoided even with the assumption of a detection error in the sheet length sensor 83.

Conversely, when it is determined that an abnormal transfer has been performed ("N" in S16), a message is displayed on the display unit 99 (for example, an LCD) prompting an operator to place an appropriate size of sheets into the sheet feed cassette. In addition, the printing operation of the facsimile data being received is stopped in S17. Therefore, only one sheet having a partial image on the first page, as shown in FIG. 5B, is ejected to the sheet ejection tray 69. In S18 it is determined that there is an error ("Y" in S18). As a result, the process is thereby temporarily terminated.

In the present aspect, the received image data based upon facsimile data is stored in the RAM 93 for example. When an appropriate or an expected size of sheet 5 is placed within the sheet feed tray 11, a predetermined operation realizes the reprinting operation.

<Other Aspects>

The present invention is not to be limited to the aspects described previously via reference to the attached drawings. For example, the following aspects are also included within the technical scope of the present invention. In addition, other aspects can be realized within the scope of the subject matter of the present invention.

(1) In the above-mentioned aspects, the photoconductor belt 33 is used. However, the present invention is not limited to the use of a photoconductor belt 33, a photoconductor drum may be used. Additionally, a photoconductor belt 33 without a joint in the belt may also realize a stable printing operation through the fixing of the laser exposure starting position.

(2) In the above-mentioned aspect, when an abnormal transfer has been determined, a message is displayed instructing the operator to exchange the sheet. However, the present invention is not limited to this, any abnormal transfer notification or indicator may be used. For example, an abnormal transfer notification such as voice notification and/or a blinking light operation through a light-emitting unit, among others, is acceptable.

(3) In the previously described aspects, a 4-cycle color laser printer is exemplified. However, the present invention is not limited to this example. In other words, any system using an intermediate transfer device may be used with this invention, for example, such as an intermediate transfer tandem color laser printer 1, and a monochrome printer, among others.

(4) In the previously described aspects, the laser exposure starting position Z is one point on the outer surface of the photoconductor belt 33. However, the present invention is not limited to only one point. Plural points at predetermined intervals on the perimeter can be used.

(5) In the previously described aspects the operation panel 164, for example, may be used to selectively set the "reliability prioritized mode" or the "high-speed printing prioritized mode." Using the operation panel 164 would allow the start-after-determination process to be performed for printer data and the scanning data when the reliability-prioritized mode is set.

What is claimed is:

1. An image forming apparatus including:
a photoconductor;
an exposure device forming an electrostatic latent image on the photoconductor based upon image data;
a development device forming a developer image on the photoconductor by developing the electrostatic latent image on the photoconductor;
an intermediate transfer device holding the developer image thereon, the developer image being transferred from the photoconductor and worth one page;
a transfer device transferring the developer image from the intermediate transfer device to a recording medium;
a detection device detecting a size of the recording medium;
a determination device determining if the size of the recording medium produced by the detection device is enough for transferring the developer image on the intermediate transfer device; and
a control device inhibiting the exposure device from forming an electrostatic latent image based upon image data for a subsequent page when the determination device determines the size of the recording medium produced by the detection device is not enough for transferring the developer image on the intermediate transfer device.

2. The image forming apparatus according to claim 1 wherein the exposure device is controlled by the control device based upon one of a plurality of processes, the plurality of processes includes:
a start-after-determination process wherein the exposure device is started after a determination result produced by the determination device is enough; and
a start-before-determination process wherein the exposure device is started before the determination result.

3. The image forming apparatus according to claim 2 wherein a type of received image data includes printing data, scanning data, and facsimile data;
wherein when the received image data type is facsimile data, the control device uses the start-after-determination process;
wherein when the received image data type is not facsimile data, the control devices uses the start-before-determination process.

4. The image forming apparatus according to claim 2 wherein the one of the plurality of processes is selected via an operation control panel.

5. The image forming apparatus according to claim 2 wherein when the determination result is not enough, then a notifying device performs a notifying operation.

6. The image forming apparatus according to claim 5, wherein the notifying operation is an illumination of an illumination device.

7. The image forming apparatus according to claim 5, wherein the notifying operation is an error message displayed on a display device.

8. The image forming apparatus according to claim 2 wherein the size of recording medium is detected during transportation of the recording medium.

9. The image forming apparatus according to claim 8 wherein the detection device includes:
an edge detector configured to detect a leading edge and a trailing edge of the recording medium in a transportation direction;
wherein the size of the recording medium is a length in a transportation direction of the recording medium.

10. The image forming apparatus according to claim 9, wherein the edge detector includes a lever located in a transportation path of the recording medium.

11. The image forming apparatus according to claim 3 wherein when the control device uses the start-after-determination process, the determination device determines if a reduced size of recording medium produced by the detection device is enough for transferring the developer image on the intermediate transfer device, so as to produce the determination result.

12. An image forming apparatus including:
a photoconductor;
an exposure device forming an electrostatic latent image on the photoconductor based upon image data;
a development device forming a developer image on the photoconductor by developing the electrostatic latent image on the photoconductor;

an intermediate transfer device holding the developer image thereon, the developer image being transferred from the photoconductor and worth one page;

a transfer device transferring the developer image from the intermediate transfer device to a recording medium;

a detection device detecting a size of the recording medium;

a determination device determining if the size of the recording medium produced by the detection device is enough for transferring the developer image on the intermediate transfer device; and a control device inhibiting the exposure device from forming an electrostatic latent image based upon image data;

wherein when image data is facsimile data an exposing operation by the exposure device is performed after a first page of the facsimile data is received, and wherein a subsequent exposing operation by the exposure device is performed when each subsequent page of the facsimile data is received and a determination result produced by the determination device of a previous page is enough.

13. The image forming apparatus according to claim 12 wherein the exposure device is controlled by the control device based upon one of a plurality of processes, the plurality of processes includes:

a start-after-determination process wherein the exposure device is started after the determination result is enough; and a start-before-determination process wherein the exposure device is started before the determination result.

14. The image forming apparatus according to claim 13, further comprising a notice device;

wherein when the determination result is not enough and the control device is using the start-after-determination process, the notice device performs a notifying operation.

15. An image forming apparatus including:

a photoconductor;

an exposure device forming an electrostatic latent image on the photoconductor based upon image data;

a development device forming a developer image on the photoconductor by developing the electrostatic latent image on the photoconductor;

a hold device holding the developer image;

a transfer device transferring the developer image from the hold device to a recording medium, a detection device detecting a size of the recording medium;

a determination device determining whether the size of the recording medium detected by the detection device is suitable for the developer image, so as to produce a determination result; and a control device inhibiting the exposure device from forming an electrostatic latent image based upon image data, when the determination result is unsuitable.

16. The image forming apparatus according to claim 15, wherein the photoconductor comprises at least one predetermined exposure starting operation position; and wherein the exposure device is controlled by the control device based upon one of a plurality of processes, the plurality of processes includes:

a start-after-determination process wherein the exposure device is started at an initial predetermined exposure starting operation position reached after the determination result is unsuitable; and a start-before-determination process wherein the exposure device is started before the determination result.

* * * * *

UNITED STATES PATENT AND TRADEMARK OFFICE
CERTIFICATE OF CORRECTION

PATENT NO. : 7,558,495 B2  
APPLICATION NO. : 11/475859  
DATED : July 7, 2009  
INVENTOR(S) : Takashi Ohmiya and Nobuaki Fukasawa It is certified that error appears in the above-identified patent and that said Letters Patent is hereby corrected as shown below:

Cover Page, item [73], add Assignee: "Ricoh Printing Systems, Ltd., Tokyo (JP)" after Assignee "Brother Kogyo Kabushiki Kaisha, Nagoya-Shi, Aichi-Ken (JP)"

Signed and Sealed this

Eighth Day of December, 2009

David J. Kappos  
*Director of the United States Patent and Trademark Office*